United States Patent [19]

Kikuchi

[11] Patent Number: 5,790,688
[45] Date of Patent: Aug. 4, 1998

[54] RECOGNITION APPARATUS WITH PARALLEL SCANNING AND INTERPRETING OF MUSICAL SCORE

[75] Inventor: Takeshi Kikuchi, Hamamatsu, Japan

[73] Assignee: Yamaha Corporation, Hamamatsu, Japan

[21] Appl. No.: 314,210

[22] Filed: Sep. 28, 1994

[30] Foreign Application Priority Data

Nov. 5, 1993 [JP] Japan .................. 5-300967

[51] Int. Cl.$^6$ ............................ G06K 9/00
[52] U.S. Cl. ........................ 382/113; 382/305
[58] Field of Search .................. 382/100, 113, 382/304, 305, 307; 358/404, 444; 395/116, 510; 345/510

[56] References Cited

U.S. PATENT DOCUMENTS

| | | | |
|---|---|---|---|
| 4,571,633 | 2/1986 | Kondo | 358/280 |
| 4,974,260 | 11/1990 | Rudak | 382/57 |
| 5,202,526 | 4/1993 | Ohya | 84/462 |
| 5,404,479 | 4/1995 | Yamamoto | 395/425 |

FOREIGN PATENT DOCUMENTS

| | | | |
|---|---|---|---|
| 31 43 337 | 5/1983 | Germany | G06K 9/78 |
| 57-111776 | 7/1982 | Japan | 382/307 |
| 2 142 797 | 1/1985 | United Kingdom | 382/305 |

OTHER PUBLICATIONS

English Translation of DE 31 43 337, Stelzer, May 1983.
English Translation of JP 57-111776, Mita et al., Jul. 1982.
Matsushima, Toshiaki, et al., "Automated Recognition System for Musical Score—The Vision System of WABOT—2–", Bulletin of Science and Engineering Research Laboratory Waseda University No. 112 (1985) pp. 25–52.

Primary Examiner—Andrew W. Johns
Attorney, Agent, or Firm—Pillsbury Madison & Sutro LLP

[57] ABSTRACT

A recognition apparatus interprets a musical score to produce musical performance data. An image reader is operated for providing score image data representative of the musical score. A memory device is composed of a plurality of memory units, each memory unit being arranged to store a predetermined volume of score image data. The provided score image data is sequentially written into the plurality of the memory units volume by volume. A processor successively retrieves each volume of the written score image data from the memory units and processes the same to interpret the musical score so as to produce the musical performance data. The processor is allowed to write another volume of the score image data into a vacant one of the memory units in parallel to processing the score image data.

15 Claims, 9 Drawing Sheets

RECOGNITION APPARATUS WITH PARALLEL SCANNING AND INTERPRETING OF MUSICAL SCORE

BACKGROUND OF THE INVENTION

The present invention relates to a musical score recognition apparatus for reading an image of a given musical score containing notes and other symbols in order to produce a performance data used in an automatic performance of the musical score. Particularly, the present invention relates to the musical score recognition apparatus of the type allowing the writing of a new image data into a memory while the performance data is produced based on the previous image data stored in the memory to achieve efficient production of the performance data.

The conventional musical score recognition apparatus is provided with a digital scanner or a digitizer for reading or taking an image of the musical score containing notes and other symbols. The apparatus further carries out the recognition process of the taken score image to interpret the musical score to thereby produce a musical performance data such as MIDI data. In the conventional score recognition apparatus, a command is inputted when one page of the musical score sheets is taken into the apparatus, for commencing the recognition process of the score image data. The apparatus is controlled to inhibit inputting of a next page of the musical score sheets until the recognition process of the previous page is completed. In such a construction of the conventional score recognition apparatus, as long as the performance data is being formed based on one page volume of the score image data, a next page volume of the score image data is not entered. Stated otherwise, only after the one page volume of the score image data is completely processed to form the performance data is the next one page volume of the image data admitted. Therefore, the waiting time is rather long during the inputting of the score image data, thereby disadvantageously prolonging the a total time interval for the production of the performance data.

SUMMARY OF THE INVENTION

An object of the invention is to provide a new type of the musical score recognition apparatus designed to reduce the waiting time during inputting of image data of the musical score sheets. According to one aspect of the present invention, an apparatus for interpreting a musical score to produce the musical performance data comprises providing means for providing the score image data representative of the musical score, memory means composed of a plurality of memory units, each memory unit being arranged to store a predetermined volume of the score image data, writing means for sequentially writing the provided score image data into the plurality of the memory units volume by volume, processing means for successively retrieving each volume of the written score image data from the memory units and for processing the same to interpret the musical score so as to produce the musical performance data, and control means for allowing the writing means to write another volume of the score image data into a vacant one of the memory units in parallel to processing of the score image data by the processing means.

According to another aspect of the invention, an apparatus for interpreting a musical score to produce the musical performance data comprises an image reader for reading the musical score to produce the score image data, a memory having a plurality of memory areas, each memory area being arranged to store a predetermined volume of the score image data produced by the image reader, a commander for generating an interruption command effective to commence writing of the score image data into the memory, and a universal processor operative normally for successively retrieving each volume of the written score image data from the respective memory areas to process the same so as to interpret the musical score to thereby produce the musical performance data, otherwise the universal processor being operative in response to the interruption command for writing a new volume of the score image data into an available one of the memory areas while suspending the processing of the score image data.

DETAILED DESCRIPTION OF THE INVENTION

Figure 1:
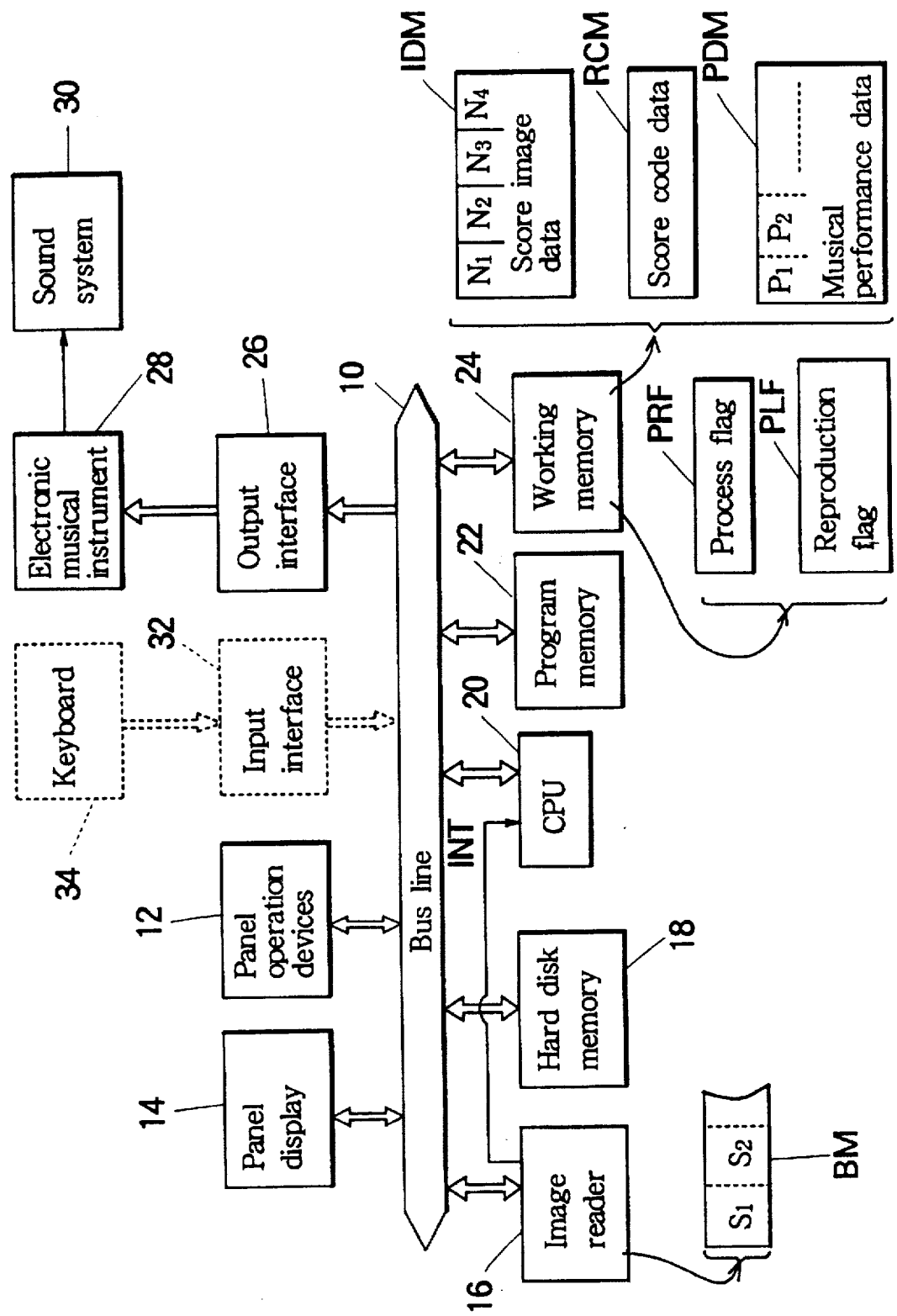
FIG. 1 is a block diagram showing an automatic musical performance machine containing one embodiment of a musical score recognition apparatus according to the invention.

FIG. 1 shows an automatic musical performance machine provided with one embodiment of the inventive musical score recognition apparatus. The automatic musical performance machine is comprised of the musical score recognition apparatus containing various components 10–26, an electronic musical instrument 28 connected to the score recognition apparatus, and a sound system 30 connected to the electronic musical instrument 28.

The musical score recognition apparatus has an internal bus line 10 connecting altogether those of a group of panel operation devices 12, a monitor such as a panel display 14, an image reader 16, a hard disk (HD) memory 18, a central processing unit (CPU) 20, a program memory 22, a working memory 24, and an output interface 26 such as a Musical Instrument Digital Interface (MIDI). A keyboard 34 and an input interface 32 may be added, if desired.

The group of panel operation devices 12 includes a keyboard containing a mode designation key, a digit key, an alphabet key and else, and a pointing tool such as a mouse implement operable to input commands on a screen of the panel display 14. The mode designation key is operated to designate one of MODE1, MODE2 and MODE0. MODE1 denotes a mode of image reading and score recognition, MODE2 denotes a mode of reproduction and editing, and MODE0 denotes other processing modes. The panel display 14 displays various screens in connection with the designated one of MODE0, MODE1 and MODE2, as will be shown in FIGS. 2–5.

The image reader 16 is composed of a digital scanner or a digitizer, and is provided with a buffer memory BM. The buffer memory BM is divided into a plurality of memory sections $S_1, S_2, \ldots$, each of which has a memory capacity smaller than one page volume of a musical score. The image reader 16 optically reads an image of the musical score (not shown) which describes a piece of music according to a musical symbol notation. The image reader 16 sequentially stores the score image data of the read musical score into the respective memory sections $S_1, S_2, \ldots$, of the buffer memory BM. The image reader 16 transmits an interruption command INT to the CPU 20 whenever each memory section is filled with an allotted division of the score image data. The CPU 20 operates in response to each interruption command INT to execute an interruption routine of FIG. 9 so as to load the score image data from the buffer memory BM into the working memory 24. The HD memory 18 is provided to reserve the score image data, and so forth, written in the working memory 24. The provision of the backup HD memory 18 can save memory capacity of the working memory 24 while reserving the score image data and so forth.

The CPU 20 functions as a universal processor to execute various processings such as image data writing, score recognition, performance data production and musical tone generation according to a program stored in the program memory 22 composed of a read-only memory (ROM), as will be illustrated in FIGS. 6–12.

The working memory 24 is composed of a random access memory (RAM). The working memory 24 is functionally divided into an image data memory IDM, a score code data memory RCM, a musical performance data memory PDM, a process flag PRF, a reproduction flag PLF and so forth. The image data memory IDM is composed of four memory areas or memory units $N_1, N_2, N_3$ and $N_4$, each of which has a certain memory capacity arranged to store a predetermined volume of the score image data, for example, one page volume in case the score image data is taken from sheets of the musical score. In this event, the memory units $N_1-N_4$ may be called a page memory unit. The score code data memory RCM stores the score code data which is obtained by recognition of the score image data, i.e., by interpretation of the musical score. The performance data memory PDM stores the musical performance data produced according to the score code data. The performance data memory PDM is composed of a plurality of memory units $P_1, P_2, \ldots$, each of which can store a predetermined volume of the performance data corresponding to one page volume of the score image data. The number of the performance data memory units $P_1, P_2, \ldots$ may be set greater than that of the score image data memory units $N_1, N_2, \ldots$ (i.e., more than four) in order to memorize all of the musical performance data of the complete musical score. The process flag PRF is comprised of a one-bit register. PRF=1 indicates that the image recognition process of the score image data is running, while PRF=0 indicates that the image recognition process is not running. The reproduction flag PLF is also composed of a one-bit register. PLF=1 indicates that the automatic performance is running according to the musical performance data stored in PDM, while PLF=0 indicates that the automatic performance is not running.

The MIDI output interface 26 operates under control by the CPU 20 to output the performance data in the form of a tone event data to a tone generator installed in the electronic musical instrument 28. The tone event data contains an ON and OFF data indicative of a start and stop of musical tone generation, and a pitch data indicative of a pitch of a musical tone to be generated. The tone generator of the electronic musical instrument 28 is constructed to generate a musical tone signal according to the tone event data. The sound system 30 converts the musical tone signal fed from the electronic musical instrument 28 into a musical sound.

Figure 2:
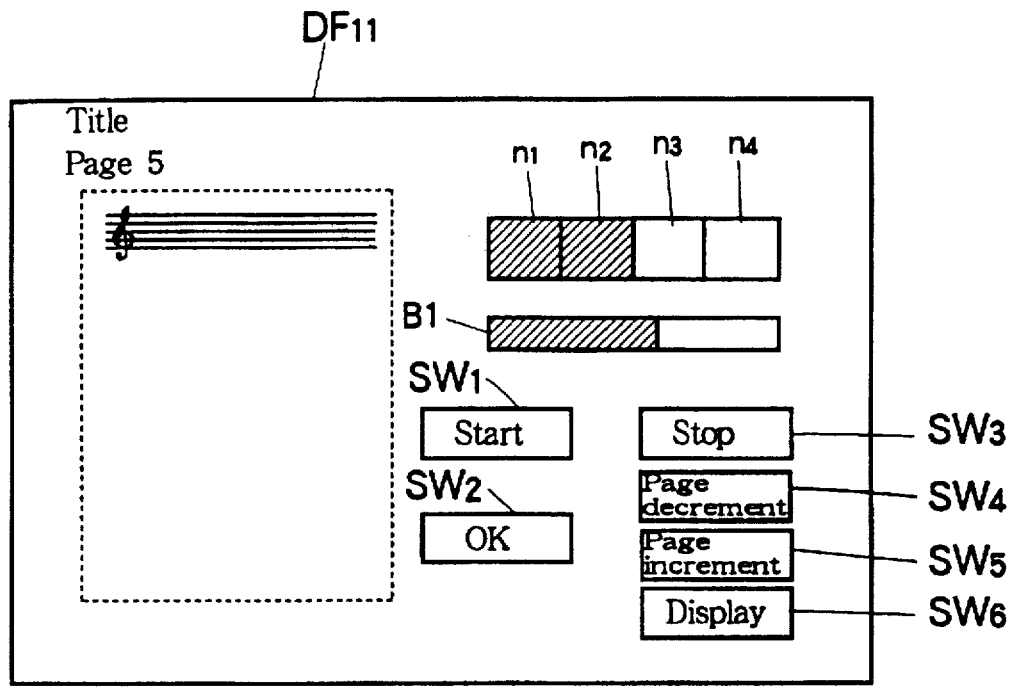
FIG. 2 is a front view of a panel display showing an input image screen.
Figure 3:
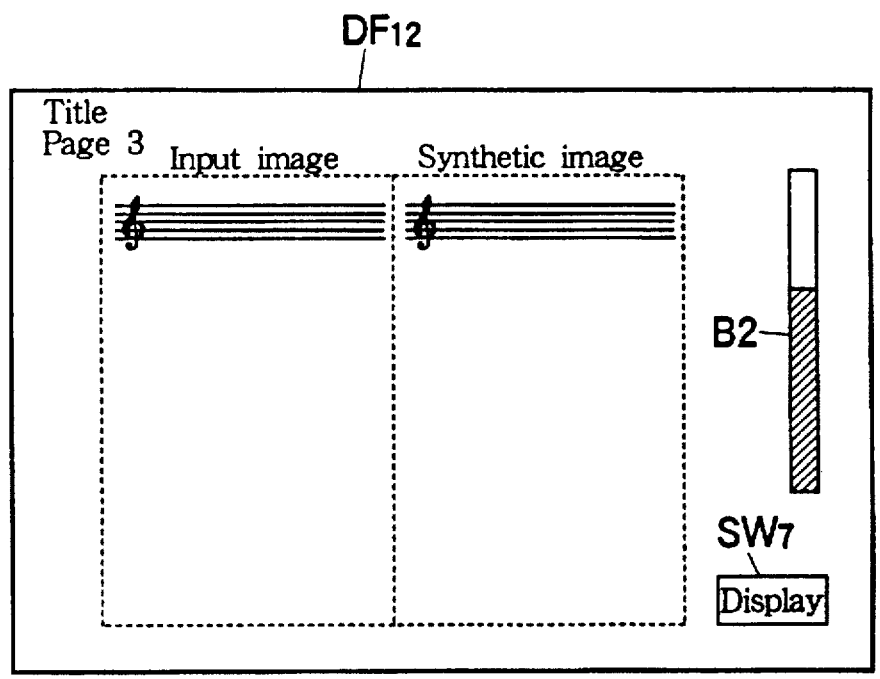
FIG. 3 is a front view of the panel display showing a synthetic image screen.
Figure 4:
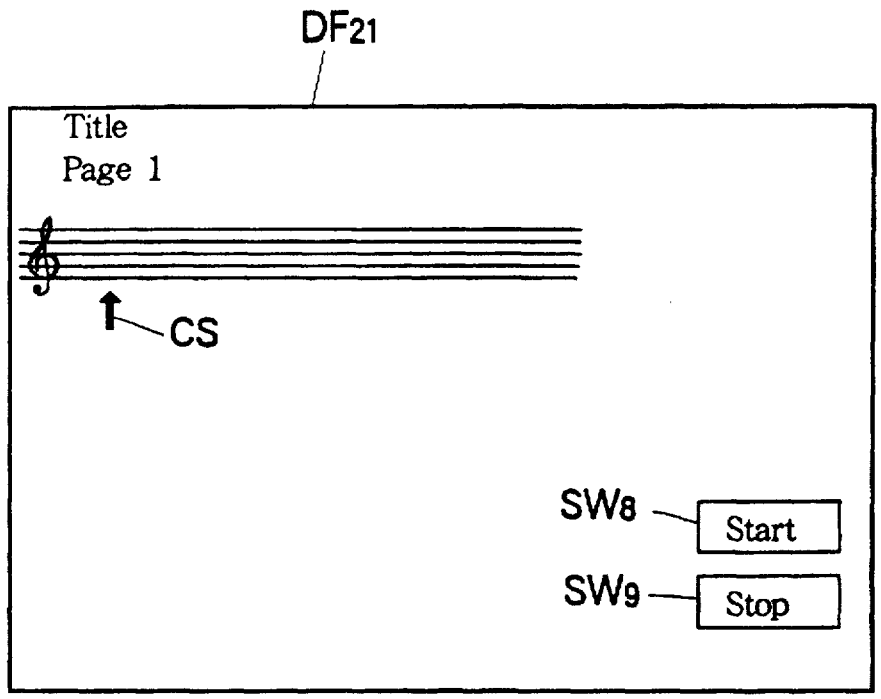
FIG. 4 is a front view of the panel display showing an active reproduction screen.
Figure 5:
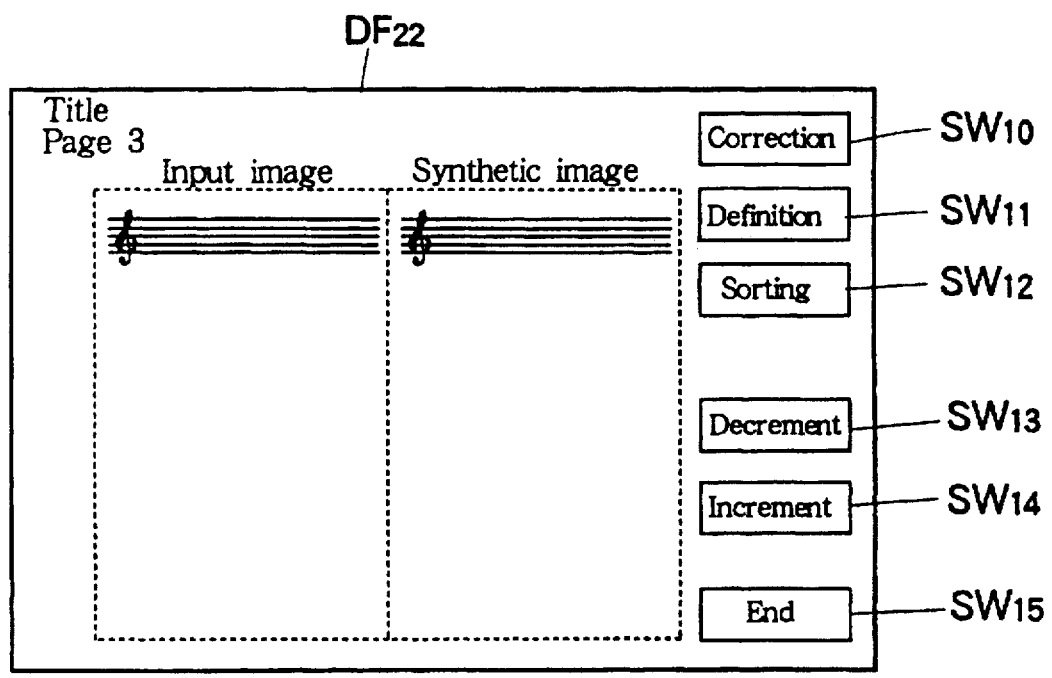
FIG. 5 is a front view of the panel display showing an editing screen.

FIGS. 2 and 3 show a screen displayed under MODE1 of the image reading and recognition. FIG. 2 represents an image reading screen $DF_{11}$, and FIG. 3 represents an image recognition screen $DF_{12}$. FIGS. 4 and 5 show a screen displayed under MODE2 of the reproduction and editing. FIG. 4 represents an active reproduction screen $DF_{21}$, and FIG. 5 represents an editing screen $DF_{22}$. These screen $DF_{11}$, $DF_{12}$, $DF_{21}$ and $DF_{22}$ are labeled by a song title and a page number.

Referring first to FIG. 2, the image reading screen $DF_{11}$ presents an input image representative of one page of the musical score based on the score image data taken by the image reader. The screen $DF_{11}$ is identified by the page number indicated on the screen. Further, the screen $DF_{11}$ presents a read volume of the score image data and a progression state of the image recognition process. As to monitoring of the read volume of the score image data, the screen $DF_{11}$ displays four rectangle marks $n_1-n_4$ corresponding to the four page memory units $N_1-N_4$ of IDM. Shading is applied to any of the rectangle marks $n_1-n_4$, which corresponds to a page memory unit fully written with one page volume of the score image data, thereby visually monitoring vacant and filled ones of the page memory units $N_1-N_4$ in a discriminative manner. With regard to monitoring the progression state of the image recognition process, the screen $DF_{11}$ presents a bar indicator B1 having a length corresponding to one page volume of the score image data. The bar indicator B1 is partly shaded to indicate an amount of the score image data which has been processed for the score recognition. In a variation, the rectangle marks $n_1-n_4$ are successively displayed from left to right to indicate a number of the filled page memory units instead of shading the rectangle marks $n_1-n_4$ corresponding to the page memory units $N_1-N_4$.

The screen $DF_{11}$ further displays various graphic switches such as a reading start switch $SW_1$, an OK switch $SW_2$, a reading stop switch $SW_3$, a page decrement switch $SW_4$, a page increment switch $SW_5$, and a display switch $SW_6$. These graphic switches $SW_1-SW_6$ can be actuated by graphical operation on the screen such that the mouse implement is manipulated to move a cursor to a desired switch and then a mouse button is clicked to actuate the graphic switch. The reading start switch $SW_1$ is actuated to input an enabling command effective to enable the score image reading. The reading stop switch $SW_3$ is used to command a stop of the score image reading. The OK switch $SW_2$ is actuated when the operator confirms the safe reading of the one page volume of the score image data for inputting another enabling command effective to enable the image recognition process of the one page volume. The page decrement switch $SW_4$ is actuated to change the current screen $DF_{11}$ to a preceding page of the musical score. The page increment switch $SW_5$ is actuated to change the current screen $DF_{11}$ to a succeeding page of the musical score. The display switch $SW_6$ is actuated to switch the image reading screen $DF_{11}$ of FIG. 2 to the image recognition screen $DF_{12}$ of FIG. 3.

Referring to FIG. 3, the image recognition screen $DF_{12}$ presents a corresponding pair of an input or original image and a synthetic image in parallel manner. The input image represents one page of the musical score read by the image reader and specified by the indicated page number. The synthetic image represents the same page of the musical score, but is synthesized according to results of the score recognition process. Namely, the read score image data is subjected to the recognition process to obtain a score code data representative of musical symbols contained in the original musical score. For example, a quarter note contained in the musical score is recognized to produce a code data corresponding to the recognized quarter note. Then, a graphic symbol such as the quarter note symbol is selected from an internal font memory according to the score code data to synthesize the musical score image. Normally, the synthetic image is much clearer, compared to the input image. However, these input and synthetic images of the musical score may incidentally contain an unclear portion due to failure of the image reading or the image recognition. In such a case, the unclear portion is corrected by the editing process, as will be described later. Though the screen $DF_{12}$ presents only one staff of the musical score, both the input image and the synthetic image actually contain a plurality of staffs which constitute one page of the musical score sheets.

The screen $DF_{12}$ further presents a bar indicator B2 which indicates a progression state of the recognition process in a manner similar to the bar indicator B1 of the screen $DF_{11}$. However, the bar indicator B2 is arranged vertically, while the bar indicator B1 is arranged horizontally. A display switch $SW_7$ is actuated to return the screen $DF_{12}$ of FIG. 3 to the screen $DF_{11}$ of FIG. 2. Thus, the user can select either of the screens $DF_{11}$ and $DF_{12}$ by actuating the switches $SW_6$ and $SW_7$.

Referring next to FIG. 4, the active reproduction screen $DF_{21}$ successively presents notes and rests on a blank score format during the progression of the automatic performance based on the performance data stored in the memory PDM. An arrow-like cursor CS is moved along the score to point to each note and rest with the progression of the automatic performance. The notes and so forth are displayed according to the score code data which is obtained by the recognition process. The screen $DF_{21}$ further presents a reproduction start switch $SW_8$ and a reproduction stop switch $SW_9$, which are graphically operated by means of the mouse implement. The start switch $SW_8$ is actuated to command a start of the automatic performance, i.e., the acoustic reproduction of the musical score. The stop switch $SW_9$ is actuated to stop the automatic performance. Further, by the actuation of the stop switch $SW_9$, the active reproduction screen $DF_{21}$ is switched to the editing screen $DF_{22}$ which presents a last page of the musical score involving a stop point of the automatic performance. Further, when the automatic performance is ended, the active reproduction screen $DF_{21}$ is turned to the editing screen $DF_{22}$ which presents the last page of the musical score.

Referring to FIG. 5, the editing screen $DF_{22}$ presents a corresponding pair of the input image and the synthetic image of the same page specified by the displayed page number in a manner similar to the image recognition screen $DF_{12}$ of FIG. 3. The user can conduct the editing process such as correction, definition and page sorting by graphic operation on the screen. In order to enable the editing process, the screen $DF_{22}$ displays a correction switch $SW_{10}$, a definition switch $SW_{11}$ and a sorting switch $SW_{12}$. Further, the screen $DF_{22}$ contains a page decrement switch $SW_{13}$, a page increment switch $SW_{14}$ and an end switch $SW_{15}$. The switches $SW_{13}$ and $SW_{14}$ are similar to the switches $SW_4$ and $SW_5$ involved in the screen $DF_{11}$ of FIG. 2. The end switch $SW_{15}$ is actuated to finish the editing process. Upon actuation of the switch $SW_{15}$, the editing screen $DF_{22}$ of FIG. 5 is turned to the active reproduction screen $DF_{21}$ of FIG. 4.

Figure 6:
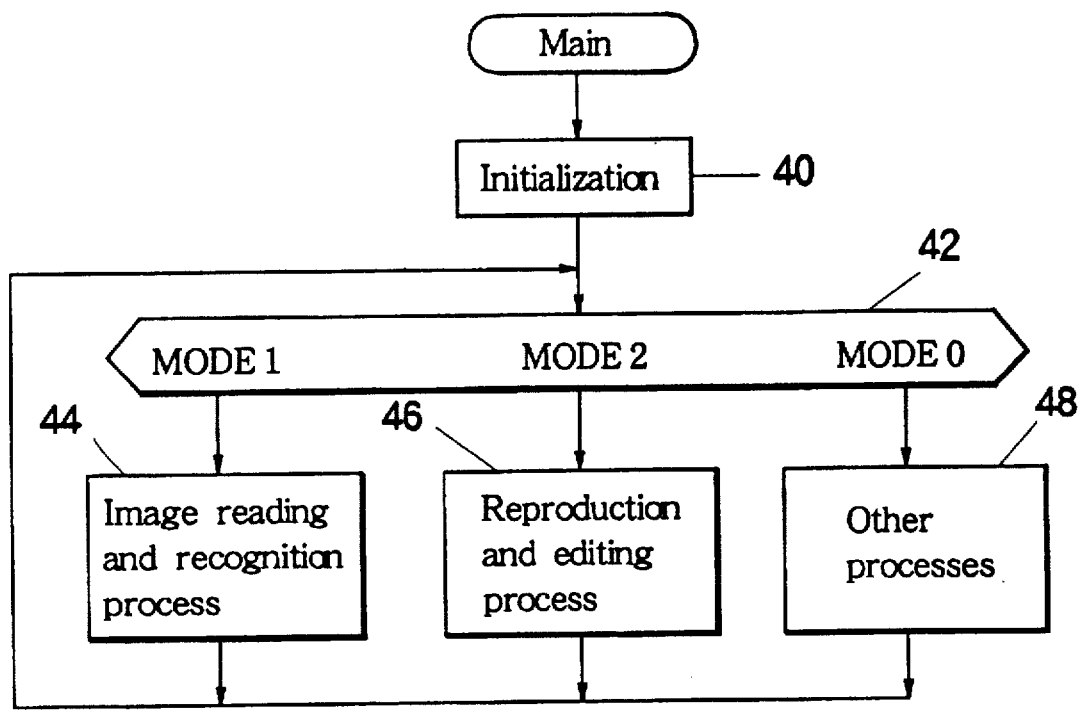
FIG. 6 is a flowchart showing a main routine executed by the inventive musical score recognition apparatus.

FIG. 6 shows a main routine which is commenced when the score recognition apparatus is powered. Firstly, Step 40 is undertaken to carry out initialization. For example, the flags PRF and PLF are set to "0". Then, Step 42 is undertaken to check as to which of MODE0, MODE1 and MODE2 is selected. If MODE1 is selected, Step 44 is undertaken to execute a routine of the image reading and recognition process, as will be described in conjunction with FIG. 7. Thereafter, the routine returns to Step 42 to repeat the process of Step 44 as long as MODE1 is held. If MODE2 is selected, Step 46 is undertaken to execute a routine of the reproduction and editing process, as will be described later in conjunction with FIG. 10. Thereafter, the routine returns to Step 42 to repeat the process of Step 46 as long as MODE2 is held. If MODE0 is selected, Step 48 is undertaken to execute other processes, which may include feeding of the performance data stored in the memory PDM by bulk dump process to the electronic musical instrument 28 such as a sequencer which is connected to the MIDI output interface 26. The sequencer suitably processes the fed performance data to carry out an expressive automatic performance of the musical score. After Step 48, the routine returns to Step 42 to thereby repeat the same Step 48 as long as MODE0 is held.

Figure 7:
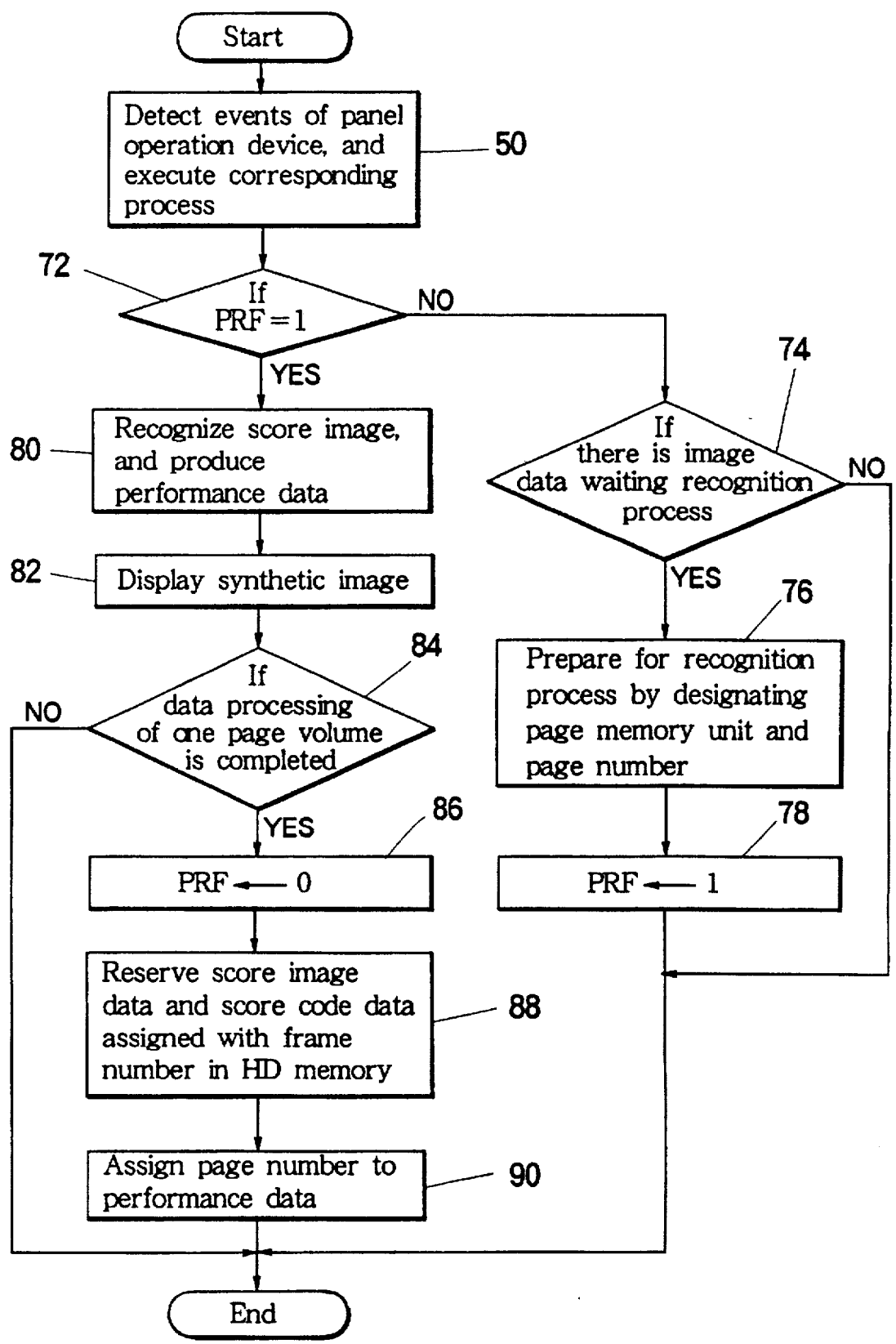
FIG. 7 is a flowchart showing a routine of image reading and recognition process.

FIG. 7 shows the routine of the image reading and recognition process. Firstly, Step 50 is undertaken to detect events of the various panel operation devices and to execute various processes according to the detected events. Step 50 contains a subroutine of an ON event process of the reading start switch, as shown in FIG. 8.

Figure 8:
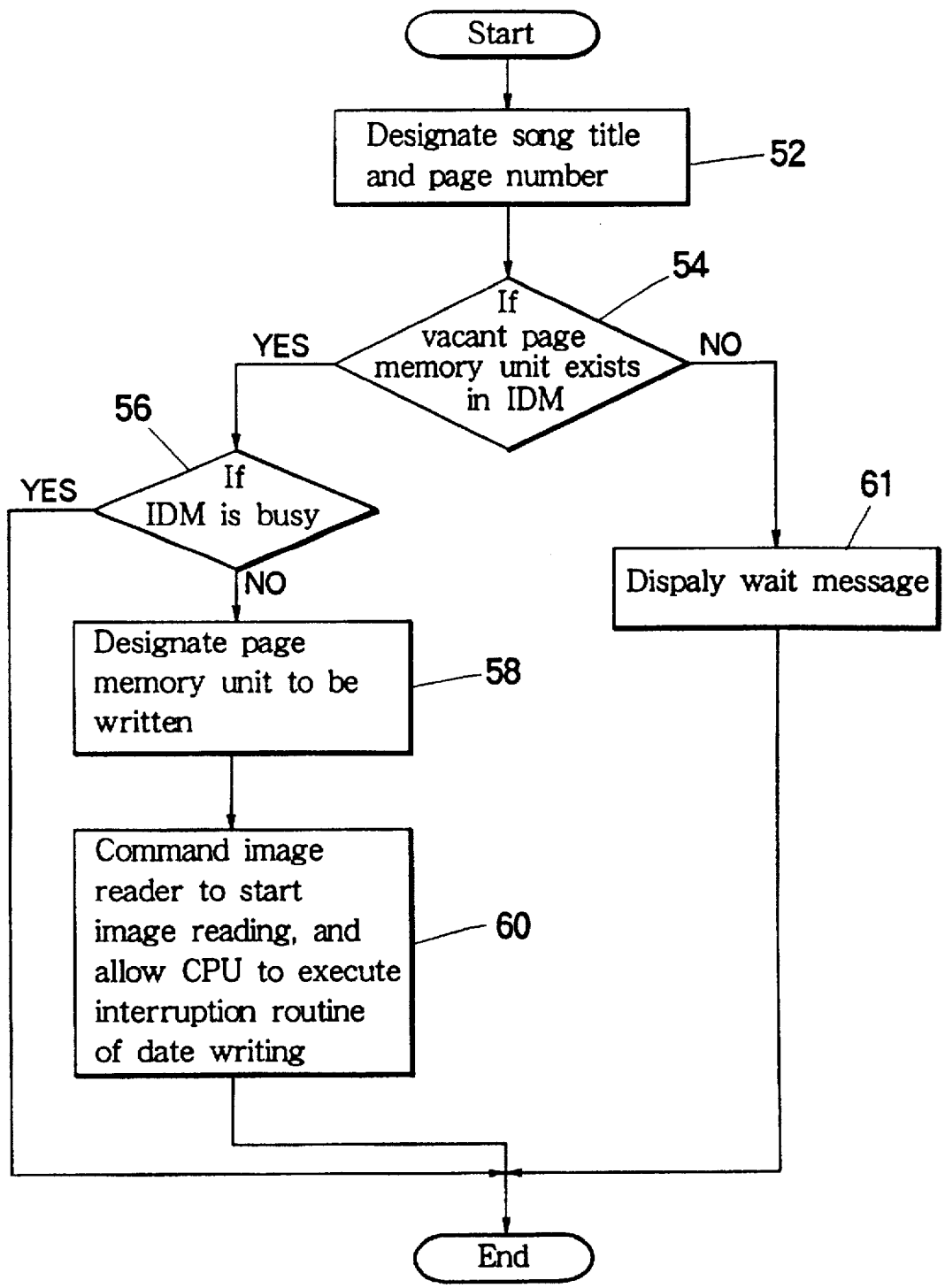
FIG. 8 is a flowchart showing a routine of an ON event process of a writing start switch.

Referring to FIG. 8, the subroutine is commenced in response to the enabling command by the actuation of the reading start switch $SW_1$ on the screen $DF_{11}$. Firstly, Step 52 is undertaken to designate a song title and a page number of the musical score to be read by actuating a keyboard included in the group of the panel operation devices 12. Next Step 54 is undertaken to check whether there is a vacant page memory unit in the memory IDM. If Yes, Step 56 is undertaken to check whether the score image data is currently being written into the memory IDM, i.e., to see if the memory IDM is busy. If No, Step 58 is undertaken to designate one of the page memory units of IDM. The page memory units $N_1$–$N_4$ of IDM are used in cyclic manner. Namely, the page memory units $N_1$, $N_2$, $N_3$ and $N_4$ are sequentially designated in this order for writing of the score image data. Meanwhile, the page memory units $N_1$, $N_2$, $N_3$ and $N_4$ are accessed in this order for retrieving therefrom the written score image data in the score recognition process. Written contents of each page memory unit are erased when the recognition process is finished so that a filled state of each page memory unit is turned to a vacant state. By such manner, the writing of the image data returns from the last page memory unit $N_4$ to the first page memory unit $N_1$ in cyclic manner. Subsequent Step 60 is undertaken to command the image reader 16 to start reading the image data, and to allow the CPU 20 to execute an interruption routine of the image writing process. Consequently, the image reader 16 optically reads the musical score to load the score image data into the buffer memory BM. Then, when the first memory section $S_1$ of the buffer memory BM is filled with the allotted division of the one page volume, an interruption command INT is fed to the CPU 20. The CPU 20 executes the interruption routine of FIG. 9 in response to the interruption command INT so that the one division of the one page volume of the image data loaded in the memory section $S_1$ of BM is written into the page memory unit $N_1$ of IDM. After finishing the writing, the loaded image data is erased from the memory section $S_1$. By such a manner, the plurality of the memory sections $S_1$, $S_2$, . . . can be used cyclicly in a manner similar to the page memory units $N_1-N_4$ of IDM. Then, the routine of FIG. 8 is ended after Step 60. If the check result of Step 56 is Yes, the routine of FIG. 8 is ended. Consequently, during the writing of one page of the musical score, subsequent writing of another page is prohibited. Further, if the check result of Step 54 is No, Step 61 is undertaken to indicate a wait message such as "MEMORY IS FULL AND WAIT FOR A WHILE" on the panel display 14. Then, the routine of FIG. 8 is ended.

Figure 9:
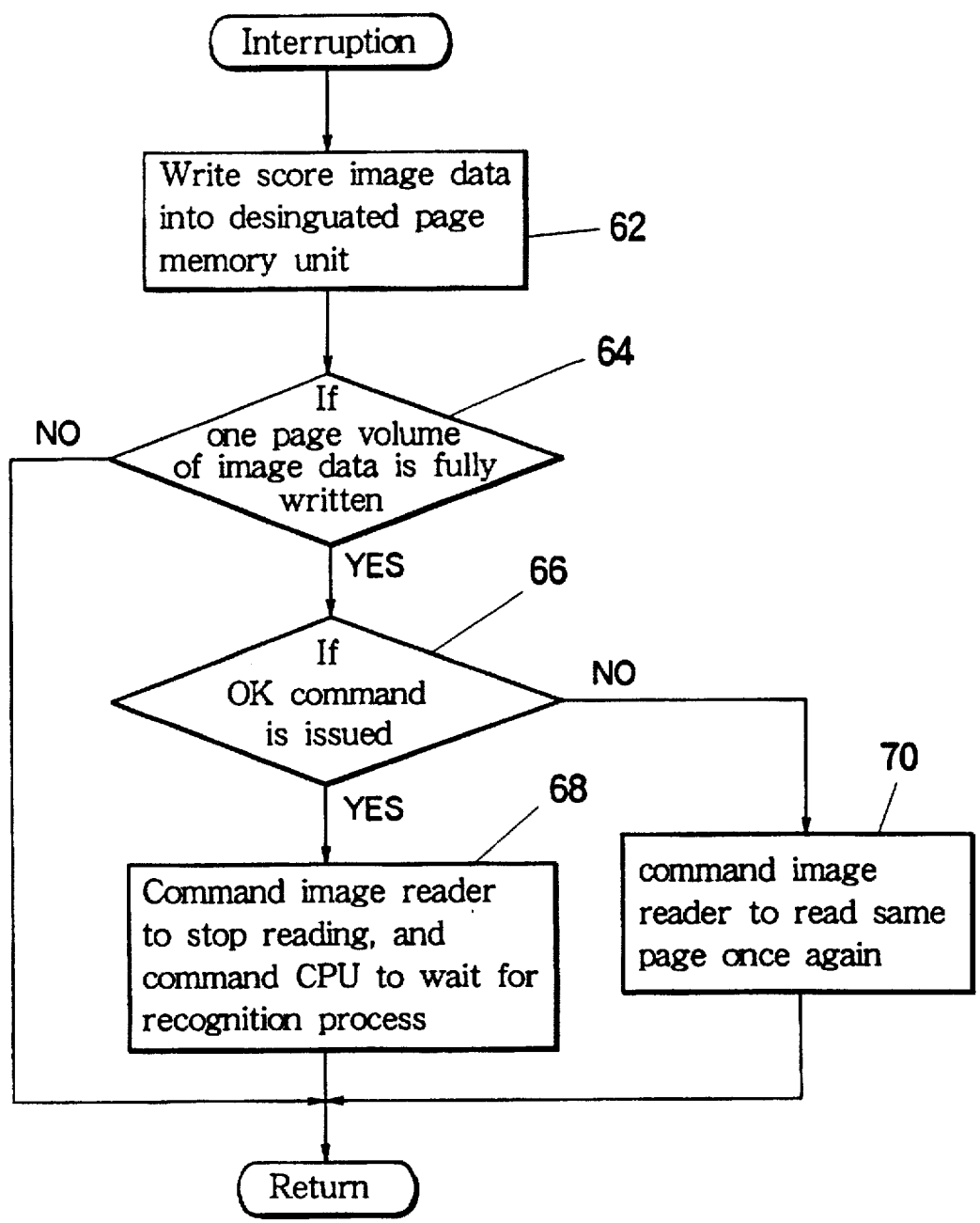
FIG. 9 is a flowchart showing an interruption routine of image admitting process.

Referring to FIG. 9, the interruption routine is started from Step 62 where the image data taken by the image reader 16 is written into the designated page memory unit of IDM through the buffer memory BM. Then, Step 64 is undertaken to check whether the writing of one page volume of the image data is completed. If No, the interruption routine returns to the FIG. 7 routine. Then, each division of the image data is repeatedly retrieved from the buffer memory BM several times so that the check result of Step 64 turns to Yes. Subsequently, Step 66 is undertaken to see if the OK switch $SW_3$ is actuated on the screen $DF_{11}$ to input another enabling command or an OK command. In this case, the OK command is normally inputted during a certain time interval after the writing of one page volume is completed. If the check result of Step 66 is Yes, subsequent Step 68 is undertaken to command the image reader 16 to stop the reading and to command the CPU 20 to wait for the recognition process of the image data written in the designated page memory unit of IDM. Then, the interruption routine returns to the FIG. 7 routine after Step 68. If the check result of Step 66 is No, Step 70 is undertaken to command the image reader 16 to re-read the same page of the musical score. Thereafter, the interruption routine returns to the FIG. 7 routine.

Referring to FIG. 7, after the image data writing process of Step 50 is finished, Step 72 is undertaken to check whether the process flag PRF=1. If No, Step 74 is undertaken to see if there is an image data waiting for the recognition process. If No, the routine of FIG. 7 is ended. By such a manner, Steps 50, 72 and 74 are sequentially executed several times. At last, the wait or standby command is issued in Step 68 of FIG. 9 so that the check result of Step 74 turns to Yes to thereby proceed to Step 76 from Step 74. Preparation of the image recognition process is carried out in Step 76. Namely, one of the page memory units of IDM is designated for the image recognition process, and a corresponding page number is indicated on the screen. For the first time, the first page memory unit $N_1$ of IDM is designated and the page number "1" is indicated. Then, Step 78 is undertaken to set the flag PRF with "1". After Step 78, the FIG. 7 routine is ended.

When the FIG. 7 routine is again called, the check result of Step 72 turns to Yes, thereby proceeding to Step 80 to carry out the image recognition process. Namely, the one page volume of the image data is retrieved from the designated page memory unit of IDM, and is subjected to the recognition process to thereby produce the score code data which is stored in the memory RCM. Further, the performance data is formed based on the score code data, and is stored in the memory PDM. The performance data may be produced in the form containing a timing data and a tone event data. The timing data represents each timing of tone generation or tone silencing, while the tone event data represents a tone event (i.e., tone pitch and on/off status). Next, Step 82 is undertaken to present the synthetic image, i.e., the recognition results on the screen $DF_{12}$ of FIG. 3 based on the score code data. Then, Step 84 is undertaken to check whether the image data processing of the one page volume is completed. Namely, the one page volume of the image data is not processed at once in Step 80, but is processed in a divided manner. During the course of the image recognition processing, occasionally the panel operation device may be actuated in Step 50. Therefore, at a first cycle of the image data processing, the check result of Step 84 is held No. Thus, the routine of FIG. 7 is ended. Thereafter, the cycle of Steps 50, 72 and 80–84 is repeatedly executed several times to thereby complete the data processing of the one page volume. Consequently, the check result of Step 84 turns to Yes, thereby proceeding to Step 86 where the flag PRF is reset to "0". In subsequent Step 88, a sequential frame number is assigned to the processed volume of the image data, for example, stored in the page memory unit $N_1$ of IDM, and the same frame number is assigned to the corresponding score code data stored in the memory RCM. Those of the score image data and the score code data are reserved in the HD memory 18. The frame number is initially set to "0". After the recording of the HD memory 18, these score image data and the corresponding score code data are erased from the memory areas of IDM and RCM, respectively. Further, Step 90 is undertaken to assign a page number to the one page of the performance data stored in the memory PDM. For example, the page number "1" is assigned to the first page of the performance data stored in the memory unit $P_1$ of PDM. Thereafter, the routine of FIG. 7 is ended.

Figure 10:
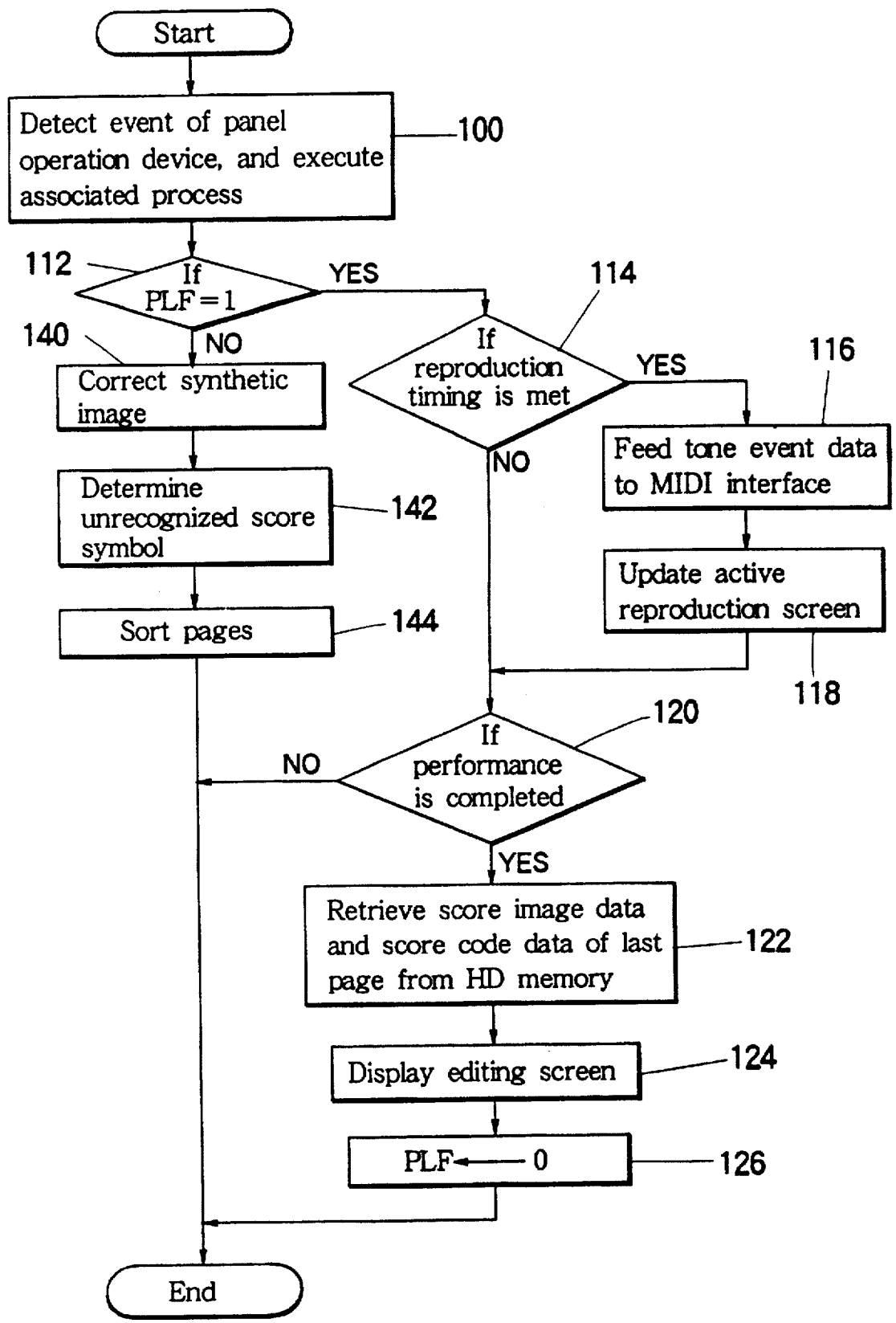
FIG. 10 is a flowchart showing a routine of reproduction and editing process.

FIG. 10 shows a routine of the reproduction and editing process. Firstly, Step 100 is undertaken to detect an event of the panel operation devices and to carry out associated processes. The processes of Step 100 include a FIG. 11 subroutine of an ON event process of the reproduction start switch, and a FIG. 12 subroutine of an ON event process of the reproduction stop switch.

Figure 11:
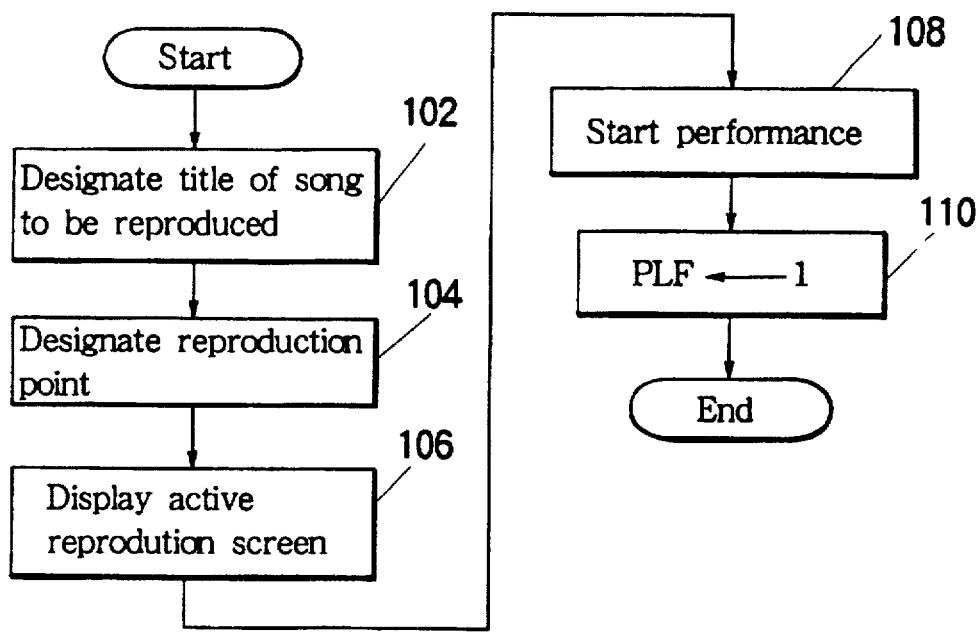
FIG. 11 is a flowchart showing a routine of an ON event process of a reproduction start switch.

Referring to FIG. 11, this subroutine is commenced when the start switch $SW_8$ is actuated on the screen $DF_{21}$ of FIG. 4 to command a start of the automatic accompaniment. Firstly, Step 102 is undertaken to designate the song title of the musical score to be reproduced by means of the keyboard involved in the group of the panel operation devices 12. Then, Step 104 is undertaken to designate a reproduction point in terms of, for example, a measure number. The measure number can be inputted by means of the keyboard included in the group of the panel operation devices 12. Then, Step 106 is undertaken to display the active reproduction screen $DF_{21}$ as shown in FIG. 4. In this case, the CPU 20 retrieves from the HD memory 18 the corresponding pair of the score image data and the score code data of the page involving the reproduction point designated by Step 104 (for example, the designated measure). These of the score image data and the score code data are transferred to the working memory 24. Then, the active reproduction screen $DF_{21}$ is synthesized based on the score code data to visually present the performance of the musical score in a progressive manner. The corresponding page number is also indicated. Further, the cursor CS is set to the start point of the performance (for example, a top point of the designated measure). Then, Step 110 is undertaken to set the flag PLF with "1". Lastly, the routine of the FIG. 11 is ended to return to the FIG. 10 routine.

Referring to FIG. 10, Step 112 is undertaken to check whether the flag PLF=1. Since the check result of Step 112 is Yes, Step 114 is subsequently undertaken to see if a reproduction timing is met with reference to a timing data of the performance start point within the memory PDM. If Yes, Step 116 is undertaken to feed a tone event data which is associated to that timing data to the tone generator of the electronic musical instrument 28 through the MIDI output interface 26. Consequently, the tone generator starts or stops generation of a musical tone signal having a pitch designated by the tone event data in response to an ON or OFF status contained in the tone event data. Then, the contents of the screen $DF_{21}$ is updated in Step 118. Namely, the cursor CS is moved on the screen $DF_{21}$ of FIG. 4 in synchronization with the progression of the performance of the musical score. Further, when the one page of the performance is finished, a next page of the performance is visually presented in the screen $DF_{21}$ together with the corresponding page number. If the check result of Step 114 is found No, or the process of Step 118 is finished, subsequent Step 120 is undertaken to see if the performance of the musical score is completed. If No, the routine of FIG. 10 is ended to return to the main routine, while the automatic performance continues.

Such a cycle of Steps 110 and 112–120 are repeatedly executed several times to reach an end of the music piece. Consequently, the check result of Step 120 turns to Yes, and Step 122 is undertaken to retrieve from the HD memory 18 a pair of the score image data and the score code data of the last page together with the corresponding frame number. These of the score image data and the score code data are stored in the working memory 24. Then, Step 124 is undertaken to display the editing screen $DF_{22}$ as shown in FIG. 5. The editing screen $DF_{22}$ presents the input image and the synthetic image of the last page in parallel to each other according to the score image data and the score code data, respectively, which are retrieved in Step 122. The corresponding page number is also indicated. Then, Step 126 is undertaken to reset the flag PLF to "0", thereby ending the routine of FIG. 10. Thereafter, when Step 112 is called again in a next cycle of the FIG. 10 routine, the check result thereof turns to No to thereby proceed to Step 140.

Figure 12:
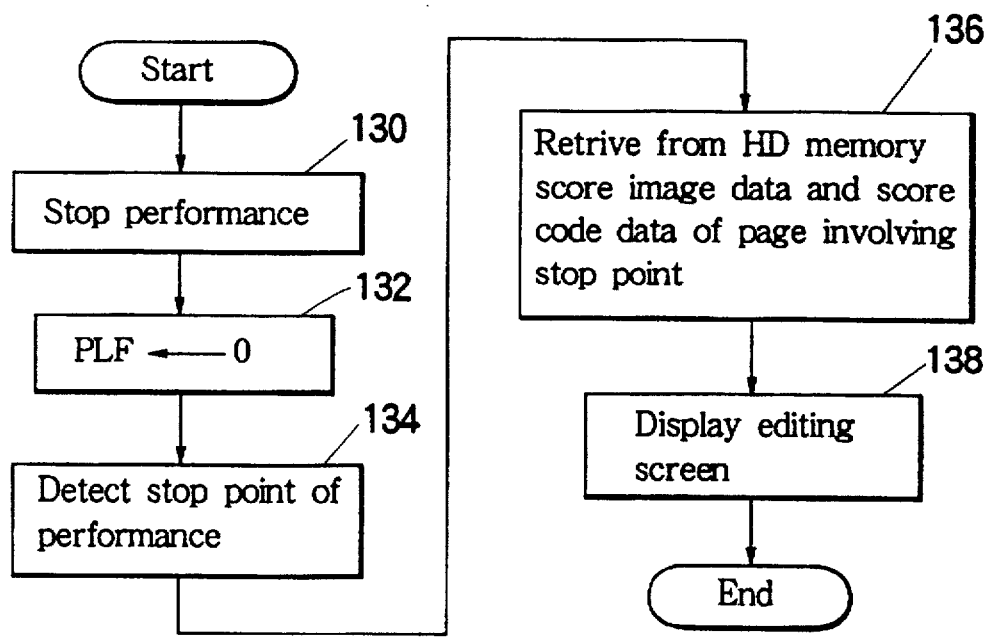
FIG. 12 is a flowchart showing a routine of an ON event process of a reproduction stop switch.

Before description of Step 140 and the following Steps, the routine of FIG. 12 will be described hereinafter. The FIG. 12 routine is commenced when the stop switch $SW_9$ is actuated on the screen $DF_{21}$ of FIG. 4 to command stopping of the automatic performance. The stop switch $SW_9$ may be actuated during the progression of the automatic performance which is started by the actuation of the start switch $SW_8$ as described before. Firstly, Step 130 is undertaken in this routine to stop the progression of the performance in response to the actuation of the stop switch $SW_9$. Then, the flag PLF is reset to "0" in Step 132. Next, Step 134 is undertaken to detect a stop point of the performance. Further, Step 136 is undertaken to retrieve from the HD memory 18 a corresponding pair of the score image data and the score code data of a particular page which contains the stop point of the performance. These score image data and the score code data are stored in the working memory 24. Then, Step 138 is undertaken to display the editing screen $DF_{22}$ shown in FIG. 5. This screen $DF_{22}$ presents the pair of the input image and the synthetic image in a musical score format according to the score image data and the score code data, respectively, taken by Step 136. The corresponding page number is also indicated. Then, the routine of FIG. 12 is ended to return to the FIG. 10 routine. In a next cycle of the FIG. 10 routine, the check result of Step 112 is turned to No, thereby proceeding to Step 140.

Referring again to FIG. 10, correction of the score synthetic image is carried out in Step 140. Namely, the correction switch $SW_{10}$ is actuated on the screen $DF_{22}$ to input a correction command. Thereafter, the mouse implement is operated to move the cursor to an object to be corrected on the score synthetic image. Then, the mouse implement is clicked to indicate characters of "note pitch" and "note length" accompanied by space windows at the right side thereof. Under such a display state, the keyboard included in the group of the panel operation devices is operated to input a desired note pitch code and a note length code, which are displayed in the corresponding windows. After confirming the displayed contents of the windows, the mouse implement is clicked once so that a note symbol defined by the inputted pitch and length replaces the designated object, while the characters "note pitch" and "note length" are erased together with the associated windows. By the correction process of Step 140, for example, a designated object of ⅛ note is corrected to ¹⁄₁₆ note, or a note pitch of "Do" is changed to "Mi".

In next Step 142, definition is given to an unrecognized object of the musical score, which fails in the recognition process. Namely, the definition switch $SW_{11}$ is actuated on the screen $DF_{22}$ of FIG. 5 to input a definition command. Thereafter, the mouse implement is operated to move the cursor to an unidentified object on the score synthetic image. Then, the mouse implement is clicked so as to display a menu containing various score symbols. The unidentified object is marked by an enclosing rectangle or other mark on the score synthetic image. The enclosing rectangle is addressed by the cursor, and is selected upon clicking for the definition process. Otherwise, the cursor is moved to other areas than the rectangle portion. Upon clicking, a desired musical symbol can be defined to the pointed area. In either case, a desired symbol such as "natural" is selected from the menu by a one shot clicking of the mouse implement to give a definition to the unrecognized object.

Then, Step 144 is undertaken to carry out the page sorting. Namely, the sorting switch $SW_{12}$ is actuated on the screen $DF_{22}$ of FIG. 5 to input a page sorting command. Consequently, characters "error page" and "destination" accompanied by windows at the right side thereof are displayed on the screen. For example, if the sheets of the musical score are successively read in the wrong page order of 1, 2, 3, 5, 6, 7, 4, Step 90 of FIG. 7 is carried out to automatically apply the page numbers in the order of 1, 2, 3, 4, 5, 6, 7 to each page of the performance data without regard to the wrong page order. The page sorting is conducted to correct such a disorder of the page numbering which would disturb a regular flow of the automatic performance. In the exemplified case, a number "7" is filled in the window labeled by "error page", and a message "after 3" is filled in the other window labeled by "destination". Such an input operation is carried out by means of the keyboard contained in the group of the panel operation devices. After confirming the displayed contents of these windows, the mouse implement is clicked once so that the pages of the performance data are rearranged in the order of 1, 2, 3, 7, 4, 5, 6. Thereafter, new numbering is effected in the order of 1, 2, 3, 4, 5, 6, 7, thereby achieving the normal automatic performance after the inputted musical score.

In the correction processes by Steps 140, 142 and 144, the contents of the memory PDM are rewritten according to the corrected or defined symbols and the rearranged page order. Consequently, the automatic performance can be effected according to the corrected performance data stored in the memory PDM after the editing process in order to improve the quality of the performance as compared to the initial performance prior to the editing process. The routine of FIG. 10 is ended after Step 144. Thereafter, when the end switch $SW_{15}$ is actuated on the screen $DF_{22}$ of FIG. 5 to input an editing end command, the screen $DF_{22}$ is changed to the screen $DF_{21}$ of FIG. 4 by Step 100.

The present invention is not limited to the disclosed embodiments, but may cover various modifications as follows. A track ball or a stylus pen can be utilized in place of the mouse implement as the pointing device. The musical tone signal can be generated by an internal tone generator connected to the bus line 10 instead of using the external electronic musical instrument 28. The image recognition process can be automatically commenced after one page volume of the score image is taken rather than actuating the switch $SW_2$ to input the OK command. In the editing process, the note pitch and length can be designated by means of the additional musical keyboard implement 34 connected to the bus line 10 through the additional MIDI input interface 32 as shown in FIG. 1.

As described above, according to the present invention, the writing of the score image data and the production of the performance data are carried out in parallel manner with each other. Accordingly, immediately after a one page volume of the score image data is taken into the recognition apparatus, a next one page volume can be taken without waiting. Therefore, the waiting time can be reduced in the writing process of the score image data into the working memory, while the performance data can be formed efficiently.

What is claimed:

1. An apparatus for interpreting a musical score to produce musical performance data, the apparatus comprising:
   providing means for providing score image data representative of the musical score;
   memory means comprising a plurality of memory units, the plurality of memory units being arranged such that each memory unit stores a predetermined volume of the score image data which is equivalent to one page of the musical score;
   writing means for sequentially writing the provided score image data into the plurality of the memory units volume by volume;
   processing means for successively retrieving each volume of the written score image data from the memory units and for processing the retrieved volume of the written score image data to interpret the musical score to produce the musical performance data; and
   control means for allowing the writing means to write another volume of the score image data into a vacant memory unit while allowing the processing means to process the retrieved volume of the written score image data simultaneously with, and in parallel to, the writing of the another volume of the score image data into the vacant memory unit.

2. An apparatus according to claim 1, wherein the processing means includes checking means for determining if another volume of the score image data remains in the memory means when the processing of one volume of the score image data is finished so that said another volume of the score image data, if remaining, can be automatically processed subsequently to said one volume of the score image data.

3. An apparatus according to claim 1, wherein the writing means includes inhibiting means for inhibiting writing of a second volume of the score image data while a first volume of the score image data is being written into the memory means.

4. An apparatus according to claim 1, further comprising monitor means for monitoring volumes of the score image data stored in the memory means.

5. An apparatus according to claim 1, further comprising monitor means for monitoring volumes of the score image data processed by the processing means.

6. An apparatus according to claim 1, further comprising means for designating one of the memory units for writing the provided score image data.

7. An apparatus according to claim 1, further comprising means for designating one of the memory units for retrieving and processing the written score image data in the designated memory unit.

8. An apparatus for interpreting a musical score to produce musical performance data, the apparatus comprising:
   an image reader for reading the musical score to produce score image data;
   a memory having a plurality of memory areas, the plurality of memory areas being arranged such that each memory area stores a predetermined volume of the score image data produced by the image reader;
   a commander for generating an interruption command which starts a writing of the score image data into the memory; and
   a processor for successively retrieving each volume of the written score image data from the respective memory areas to process the written score image data to interpret the musical score to produce the musical performance data, the processor being responsive to the interruption command such that the processor suspends the processing of the written score image data while writing the score image data into a vacant memory area in response to the interruption command.

9. An apparatus according to claim 8, wherein each memory area has a capacity to store the predetermined volume which is equivalent to one page of the musical score.

10. An apparatus according to claim 8, wherein the commander includes means for generating the interruption command when the image reader reads a division of the predetermined volume of the score image data.

11. An apparatus according to claim 10, wherein the processor includes means for restoring the processing of the score image data after the division of the predetermined volume is written into the memory.

12. An apparatus according to claim 8, wherein the commander includes means for generating an enabling command effective to enable the image reader to start the reading of the musical score, and being effective to enable the processor to execute the writing of the score image data.

13. An apparatus according to claim 8, wherein the processor includes means operative when the memory has no vacant memory area for inhibiting the writing of a new volume of the score image data.

14. An apparatus according to claim 8, wherein the processor includes means operative when one volume of the score image data is being written into the memory for inhibiting the writing of another volume of the score image data into the memory.

15. A method of interpreting a musical score to produce a musical performance data, the method comprising the steps of:
   providing score image data representative of the musical score;
   writing the provided score image data into a plurality of memory units volume by volume;
   retrieving each volume of the written score image data from the memory units;

processing the retrieved volume of the written score image data to interpret the musical score to produce the musical performance data; and writing another volume of the score image data into a vacant memory unit while processing the retrieved volume of the written score image data simultaneously with, and in parallel to, the writing of the another volume of the score data into the vacant memory unit;

wherein each volume is equivalent to one page of the musical score.

* * * * *